US012172256B2

(12) United States Patent
Nagaoka et al.

(10) Patent No.: US 12,172,256 B2
(45) Date of Patent: Dec. 24, 2024

(54) APPARATUS AND METHOD FOR DETECTING FAILURE IN HOLDING TOOL OF MACHINE TOOL

(71) Applicant: HONDA MOTOR CO., LTD., Tokyo (JP)

(72) Inventors: Shuma Nagaoka, Tokyo (JP); Yuki Yuzuri, Tokyo (JP); Toshiyuki Tanaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 264 days.

(21) Appl. No.: 18/046,512

(22) Filed: Oct. 14, 2022

(65) Prior Publication Data

US 2023/0139361 A1     May 4, 2023

(30) Foreign Application Priority Data

Nov. 2, 2021    (JP) ................................. 2021-179298

(51) Int. Cl.
| | |
|---|---|
| *B23Q 17/00* | (2006.01) |
| *G01D 5/14* | (2006.01) |
| *G01M 13/00* | (2019.01) |

(52) U.S. Cl.
CPC ............. *B23Q 17/002* (2013.01); *G01D 5/14* (2013.01); *G01M 13/00* (2013.01)

(58) Field of Classification Search
CPC ....... G01D 5/14; G01M 13/00; B23Q 17/002; B23Q 17/003; B23Q 2003/15527; B23Q 3/15506; B23Q 3/15539; B23Q 3/15553
See application file for complete search history.

(56) References Cited

FOREIGN PATENT DOCUMENTS

| CN | 114952363 B | * | 12/2023 | ............. B23Q 11/00 |
|---|---|---|---|---|
| DE | 4302530 A1 | * | 8/1993 | ........... B23Q 17/003 |
| DE | 102016106380 A1 | * | 10/2016 | ........... B23Q 17/005 |
| EP | 1938922 B1 | * | 9/2009 | ........... B23Q 17/003 |
| JP | 2006305663 A | * | 11/2006 | |
| JP | 4834056 B2 | | 12/2011 | |
| JP | 2013123774 A | * | 6/2013 | |
| JP | 2013226630 A | * | 11/2013 | |
| JP | 2017209776 A | * | 11/2017 | |
| JP | 2020082232 A | * | 6/2020 | ........... B23Q 17/005 |
| WO | WO-2018109974 A1 | * | 6/2018 | ............. B23B 31/00 |

* cited by examiner

*Primary Examiner* — Andre J Allen
(74) *Attorney, Agent, or Firm* — CKC & Partners Co. LLC

(57) ABSTRACT

Provided is an apparatus for detecting a failure in holding a tool of a machine tool that includes, in each of a plurality of tool holding mechanisms in a tool magazine, a locking member provided to have different self-displacement positions for a case where a tool is held at a proper held position between tool gripping portions of a pair of holding arms and a case where the tool is held with deviation from the proper held position, and that detects a holding failure state of the tool in the tool holding mechanism by detecting the position of a detection target portion that moves integrally with the locking member with a predetermined detector provided in the machine tool. The apparatus makes it possible to effectively prevent a risk of a breakdown of and damage to the machine tool.

8 Claims, 11 Drawing Sheets

APPARATUS AND METHOD FOR DETECTING FAILURE IN HOLDING TOOL OF MACHINE TOOL

This application is based on and claims the benefit of priority from Japanese Patent Application No. 2021-179298, filed on 2 Nov. 2021, the content of which is incorporated herein by reference.

BACKGROUND OF THE INVENTION

Field of the Invention

The present invention relates to an apparatus and a method for detecting a failure in holding a tool of a machine tool.

Related Art

Machine tools have come into widespread use which hold a plurality of tools for machining in a tool magazine in an attachable/detachable manner and perform various kinds of machining on workpieces while selectively exchanging and attaching tools suitable for a machining purposes to a machining spindle from among the tools held in the tool magazine. The present applicant has already proposed an apparatus capable of easily and stably passing a tool from a tool magazine to a machining spindle (see, for example, Japanese Patent No. 4834056).

Patent Document 1: Japanese Patent No. 4834056

SUMMARY OF THE INVENTION

In a worksite, this type of machine tool may have a disadvantage that tools are not held properly in the tool magazine due to degradation over time or for other reasons, which may result in a breakdown of or damage to the machine tool. However, the proposal in Japanese Patent No. 4834056 does not especially mention any solution for such a disadvantage.

The present invention has been made in view of the above circumstances, and an object thereof is to provide an apparatus and a method for detecting a failure in holding a tool of a machine tool, which are capable of effectively preventing a risk of a breakdown of and damage to the machine tool that can be caused due to improper holding a tool in a tool magazine.

A first aspect of the present invention is directed to an apparatus for detecting a failure in holding a tool of a machine tool (a machine tool 1, which will be described later, for example) including a tool magazine (a tool magazine 4, which will be described later, for example) that holds a plurality of tools (tools 6, which will be described later, for example) in an attachable/detachable manner, and configured to use one tool of the plurality of tools by selectively and exchangeably attaching the one tool to a machining spindle (a machining spindle 3, which will be described later, for example). The apparatus includes: a plurality of tool holding mechanisms (tool holding mechanisms 8, which will be described later, for example) configured to hold the tools and provided to the tool magazine. Each of the tool holding mechanisms includes a pair of holding arms (a pair of holding arms 13a, 13b, which will be described later, for example) that extend from one end side (a side of one end a, which will be described later, for example) to an other end side (a side of the other end b, which will be described later, for example) and include tool gripping portions (tool gripping portions 14, which will be described later, for example) provided on the one end side to grip the tool, a pair of supports (a pair of supports 16a, 16b, which will be described later, for example) that are provided at intermediate points of the pair of holding arms in an extending direction, an urging member (an urging member 17, which will be described later, for example) that is provided between the pair of holding arms at a location adjacent to the other end side of the holding arms and urges the tool gripping portions in a tool gripping direction via the supports, a locking member (a locking member 18, which will be described later, for example) that is interposed between the pair of holding arms and provided at a location closer to the other end than a location where the urging member is provided, and is movable between a locking position where the locking member causes the pair of holding arms to continue gripping the tool with the tool gripping portions and a release position where the locking member allows displacement to cause the pair of holding arms to discontinue gripping the tool with the tool gripping portions, and a detection target portion (a detection target portion 22, which will be described later, for example), which moves integrally with the locking member, a position of which is detected by a predetermined detector (a detector 25, which will be described later, for example). The pair of holding arms inhibit return of the locking member to the locking position in a case where the position of the tool held by the tool gripping portions has deviated from a proper held position.

A second aspect is an embodiment of the first aspect. In the apparatus for detecting a failure in holding a tool of a machine tool according to the second aspect, the detector is fixed to a predetermined portion of the machine tool, and functions as a single detector that is common to the detection target portion of each of the plurality of tool holding mechanisms.

A third aspect is an embodiment of the first or second aspect. In the apparatus for detecting a failure in holding a tool of a machine tool according to the third aspect, each of the tool gripping portions of the pair of holding arms has a gripping curved surface (a gripping curved surface 15, which will be described later, for example) with a semi-circular shape in a side view corresponding to an outer peripheral surface of a cylindrical portion of the tool or a tool holding body integrated with the tool.

A fourth aspect is an embodiment of any one of the first to third aspects. In the apparatus for detecting a failure in holding a tool of a machine tool according to the fourth aspect, the machine tool operates under control of a predetermined controller (a controller 100, which will be described later, for example), and the controller monitors a detection output from the detector, and in a case where the detection output indicating return of the locking member to the locking position is not received within a predetermined period of time following issuance of a control command to return the locking member to the locking position after causing the locking member move to the release position, the controller issues an output indicating determination of a failure in holding the tool for the machine tool.

A fifth aspect is directed to a method for detecting a failure in holding a tool of a machine tool including a tool magazine (a tool magazine 4, which will be described later, for example) that holds a plurality of tools (tools 6, which will be described later, for example) in an attachable/detachable manner, and configured to use one tool of the plurality of tools by selectively and exchangeably attaching the one tool to a machining spindle (a machine spindle 3, which will be described later, for example), The tool magazine includes a plurality of tool holding mechanisms (tool holding mechanisms 8, which will be described later, for example) that hold the tools, each of the tool holding mechanisms including a pair of holding arms (a pair of holding arms 13a, 13b, which will be described later, for example) that extend from one end side (a side of one end a, which will be described later, for example) to an other end side (a side of the other end b, which will be described later, for example) and include tool gripping portions (tool gripping portions 14, which will be described later, for example) provided on the one end side to grip the tool, a pair of supports (a pair of supports 16a, 16b, which will be described later, for example) that are provided at intermediate points of the pair of holding arms in an extending direction, an urging member (an urging member 17, which will be described later, for example) that is provided between the pair of holding arms at a location adjacent to the other end side of the holding arms and urges the tool gripping portions in a tool gripping direction via the supports, and a locking member (a locking member, which will be described later, for example) that is interposed between the pair of holding arms and provided at a location closer to the other end than a location where the urging member is provided, and is movable between a locking position where the locking member causes the pair of holding arms to continue gripping the tool with the tool gripping portions and a release position where the locking member allows displacement to cause the pair of holding arms to discontinue gripping the tool with the tool gripping portions. The method includes: a positioning step (Step S81 in FIG. 8, which will be described later, for example) of causing one of the tool gripping mechanisms in the tool magazine to move to a position where the tool gripping mechanism faces one tool; a locking release step (Step S82 in FIG. 8, which will be described later, for example) of causing the locking member to retract from the locking position to the release position; a gripping step (Step S83 in FIG. 8, which will be described later, for example) of causing the one tool to advance into a gap between the tool gripping portions of the pair of holding arms; a returning step (Step S84 in FIG. 8, which will be described later, for example) of causing the locking member to return to the locking position; and a determination step (Step S85 and Step S86 in FIG. 8, which will be described later, for example) of determining a failure in holding the tool in a case where a detection output from a detector indicating return of the locking member to the locking position is not issued within a predetermined period of time following a start of the returning step.

A sixth aspect is an embodiment of the fifth aspect. In the method for detecting a failure in holding a tool of a machine tool according to the sixth aspect, in the determination step, detection of the position of the locking member is performed using the detector that functions as a single detector common to the plurality of tool holding mechanisms.

A seventh aspect is an embodiment of the fifth or sixth aspect. In the method for detecting a failure in holding a tool of a machine tool according to the seventh aspect, in the determination step, detection of the position of the locking member is performed using a non-contact-type detector.

An eighth aspect is an embodiment of the seventh aspect. In the method for detecting a failure in holding a tool of a machine tool according to the eighth aspect, a magnetic sensor is used as the non-contact-type detector.

In the apparatus for detecting a failure in holding a tool of a machine tool according to the first aspect, each of the plurality of tool holding mechanisms in the tool magazine is provided with the tool gripping portions on the one end side of the pair of holding arms to grip a tool.

The tool gripping portions are constantly urged in the tool gripping direction by the urging member.

Further, the pair of holding arms are allowed to be displaced to discontinue gripping the tool with the tool gripping portions against an urging force of the urging member when the locking member has moved to the release position, and are caused to continue gripping the tool with the tool gripping portions when the locking member has returned to the locking position.

The pair of holding arms inhibit the return of the locking member to the locking position in a case where the position of the tool held with the tool gripping portions has deviated from the proper held position.

Therefore, the detector detects a holding failure state in which the position of the tool in the tool holding mechanism has deviated from the proper held position by detecting the position of the detection target portion that moves integrally with the locking member.

In the apparatus for detecting a failure in holding a tool of a machine tool according to the second aspect, the detector that detects the position of the detection target portion that moves integrally with the locking member is fixed to a predetermined portion in the machine tool and functions as a single detector common to the detection target portion of each of the plurality of tool holding mechanisms.

Therefore, the overall configuration of the machine tool is simplified, and maintenance management is also facilitated.

In the apparatus for detecting a failure in holding a tool of a machine tool according to the third aspect, each of the tool gripping portions of the pair of holding arms of each of the plurality of tool holding mechanisms has a gripping curved surface corresponding to an outer peripheral surface of a cylindrical portion of the tool or a tool holding body integrated with the tool.

This feature makes it possible to reliably hold the tool between the tool gripping portions of the pair of holding arms in a case where the position of the tool relative to the tool holding mechanism is the proper held position.

Moreover, the pair of holding arms in the tool holding mechanism inhibit return of the locking member to the locking position in a case where the relative positions of the tool holding mechanism and the tool are in a tool holding failure state.

This feature makes it possible to detect the tool holding failure state by the detector detecting a displaced position of the locking member.

In the apparatus for detecting a failure in holding a tool of a machine tool according to the fourth aspect, the controller that controls the machine tool monitors the detection output of the detector, and in a case where the detection output indicating return of the locking member to the locking position is not received within the predetermined period of time following issuance of a control command to return the locking member to the locking position after causing the locking member to move to the release position, the controller issues the output indicating the determination of a failure in holding the tool for the tool.

This feature makes it possible to obtain an accurate result of determination of a failure in holding the tool in consideration of the time required for the proper operation of holding the tool to be held in the tool holding mechanism.

In the method for detecting a failure in holding a tool of a machine tool according to the fifth aspect, (the tool gripping portions of) one tool gripping mechanism in the tool magazine is caused to move to a position where the tool gripping mechanism faces one tool in the positioning step, the locking member is caused to retract from the locking position to the release position in the locking release step, and movement that opens the gap between the tool gripping portions of the tool gripping mechanism is thus allowed.

In the subsequent gripping step, the one tool is caused to advance into the gap between the tool gripping portions of the pair of holding arms.

In the returning step, the locking member is caused to return to the locking position where the gap between the tool gripping portions of the tool gripping mechanism is closed.

At the time of the return of the locking member, a failure in holding the tool is determined in the determination step in a case where the return of the locking member to the locking position is not detected within a predetermined period of time following a start of the returning step.

This feature makes it possible to obtain an accurate result of determination of a failure in holding the tool in consideration of the time required for performing the proper operation for holding the tool to be held in the tool holding mechanism.

In the method for detecting a failure in holding a tool of a machine tool according to the sixth aspect, the detection of the position of the locking member is performed using the detector that functions as a single detector common to the plurality of tool holding mechanisms in the determination step.

Therefore, only a small number of detectors are needed, and the maintenance management is facilitated.

In the method for detecting a failure in holding a tool of a machine tool according to the seventh aspect, the detection of the position of the locking member is performed using the non-contact-type detector in the determination step.

Therefore, maintenance management of the detector and the structure therearound is facilitated.

In the method for detecting a failure in holding a tool of a machine tool according to the eighth aspect, the magnetic sensor is used as the non-contact-type detector.

Therefore, a detection error due to chips generated during cutting, a coolant for the cutting, or the like is unlikely to occur, thereby making it possible to obtain an accurate detection result.

DETAILED DESCRIPTION OF THE INVENTION

Figure 1:
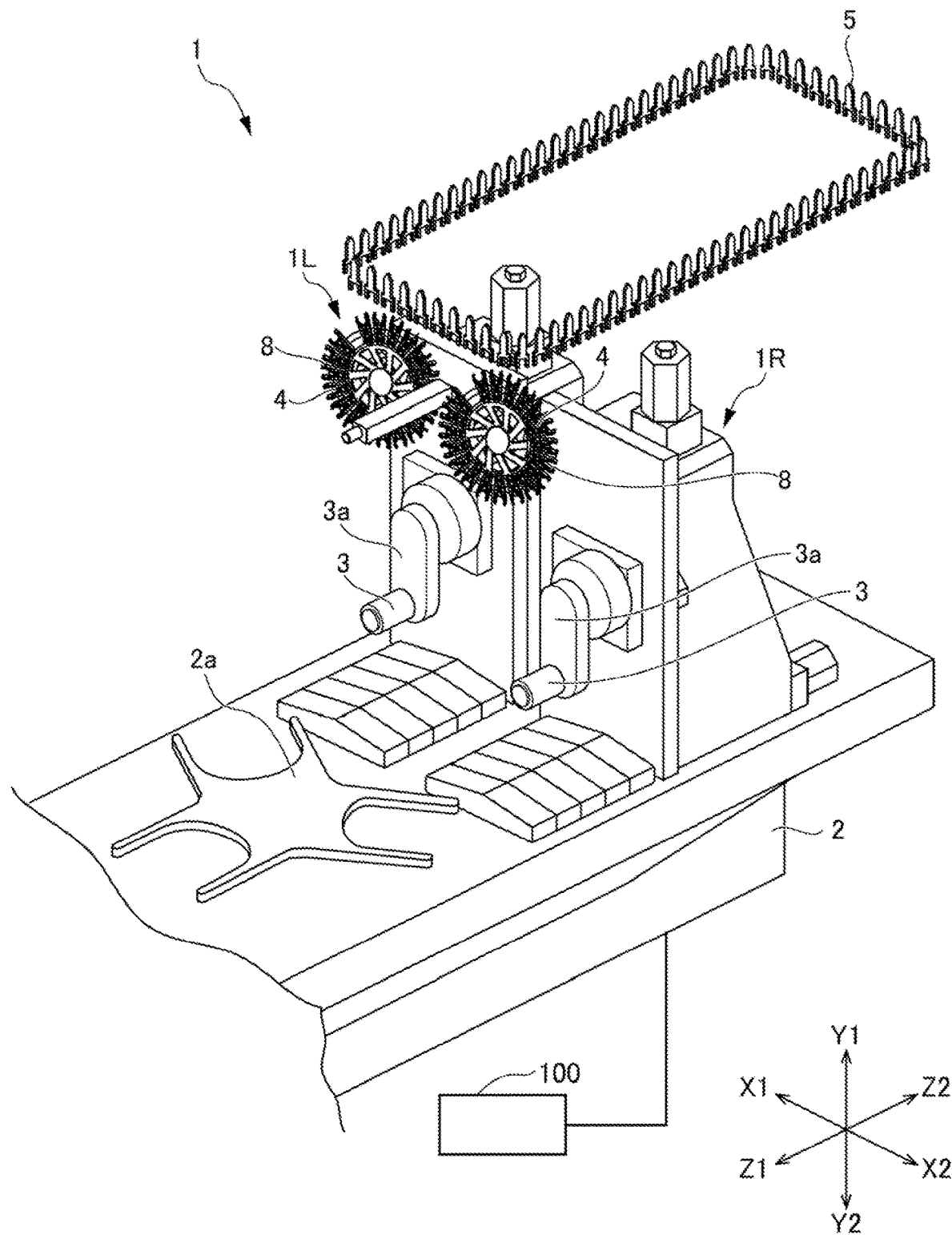
FIG. 1 is a diagram illustrating a machine tool including an apparatus for detecting a failure in holding a tool of the machine tool according to an embodiment of the present invention.
Figure 2:
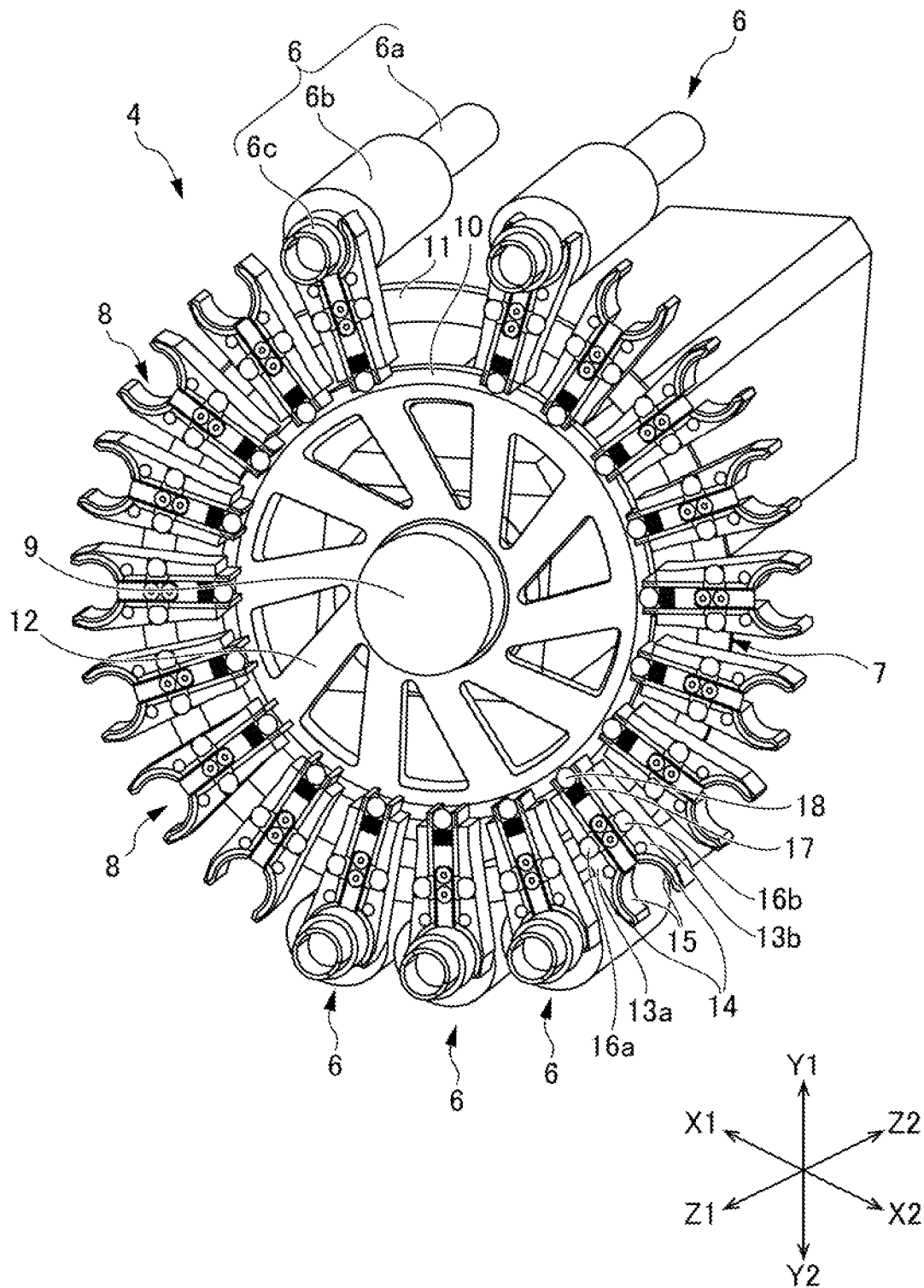
FIG. 2 is an enlarged view illustrating one tool magazine in the machine tool in FIG. 1.

FIG. 1 is a diagram illustrating a machine tool 1 including an apparatus for detecting a failure in holding a tool of the machine tool according to an embodiment of the present invention. FIG. 2 is an enlarged view illustrating one tool magazine in the machine tool 1. The machine tool 1 has a configuration in which a first machine tool 1L and a second machine tool 1R are provided on a common surface plate 2.

The first machine tool 1L and the second machine tool 1R have similar configurations. In the following description, the first machine tool 1L and the second machine tool 1R will be simply referred to as machine tool 1 except for a case where it is necessary to particularly distinguish between them. Each machine tool 1 performs drilling, boring, honing, or the like on a workpiece (not shown) placed on a work table 2a. The machine tool 1 is comprehensively managed under the control of a controller 100 including a man-machine interface.

In FIG. 1, as commonly denoted in this type of machine, the axial direction of a machining spindle 3 is defined as a Z direction, a direction toward the workpiece is defined as Z1, and the opposite direction is defined as Z2 in the Z direction.

The left-right direction that is orthogonal to the Z direction is defined as an X direction, the leftward direction seen in the X direction is defined as X1, and the opposite direction is defined as X2.

A direction that is orthogonal to the Z direction and the X direction is defined as a Y direction, an upward direction is defined as Y1, and the opposite direction is defined as Y2 in the Y direction.

The machine tool 1 includes a tool magazine 4 and an auxiliary tool magazine 5 that hold a plurality of tools 6 in an attachable/detachable manner, and uses one tool of the plurality of tools 6 by selectively and exchangeably attaching the one tool to a machining spindle 3.

In the example illustrated in FIG. 1, the tool magazine 4 is provided to each of the first machine tool 1L and the second machine tool 1R, and the auxiliary tool magazine 5 is provided as one tool magazine that is common to the first machine tool 1L and the second machine tool 1R.

The machining spindle 3 is provided on one end of a pivot arm 3a extending in a direction that is orthogonal to the Z direction, which is an axial direction of the machining spindle 3. The machining spindle 3 moves to a position at which the machining spindle 3 faces a predetermined tool holding mechanism 8 in the tool magazine 4 by way of pivoting of the pivot arm 3a, and a tool 6 is passed between the tool magazine 4 and the machining spindle 3.

The auxiliary tool magazine 5 is provided in order for multiple tools exceeding the number of tools that can be held in the tool magazine 4 to be exchangeable for the first machine tool 1L and the second machine tool 1R.

As is clear with reference to FIG. 2, the tool magazine 4 includes a plurality of tool holding mechanisms 8 for holding the tools 6 such that the tool holding mechanisms 8 face an outer circumference of the plate surface of a support body 7 whose envelope surface constitutes a disk shape and are arranged at substantially equal intervals in the circumferential direction. The support body 7 in this example is constituted by a rotation shaft 9 at the center and a first annular member 10 and a second annular member 11, which are double annular members having different outer diameters and connected with a spoke member 12.

The second annular member 11 is located outside the outer circumferential edge of the first annular member 10. All the plurality of tool holding mechanisms 8 have a similar configuration. The tool 6 includes a cutting tool 6a as a leading end portion that is integrally fitted to a cylindrical tool holding body 6b forming a base end portion, and a rear end portion of the tool holding body 6b forms a substantially cylindrical attachment portion 6c attachable to the machining spindle 3.

Figure 3:
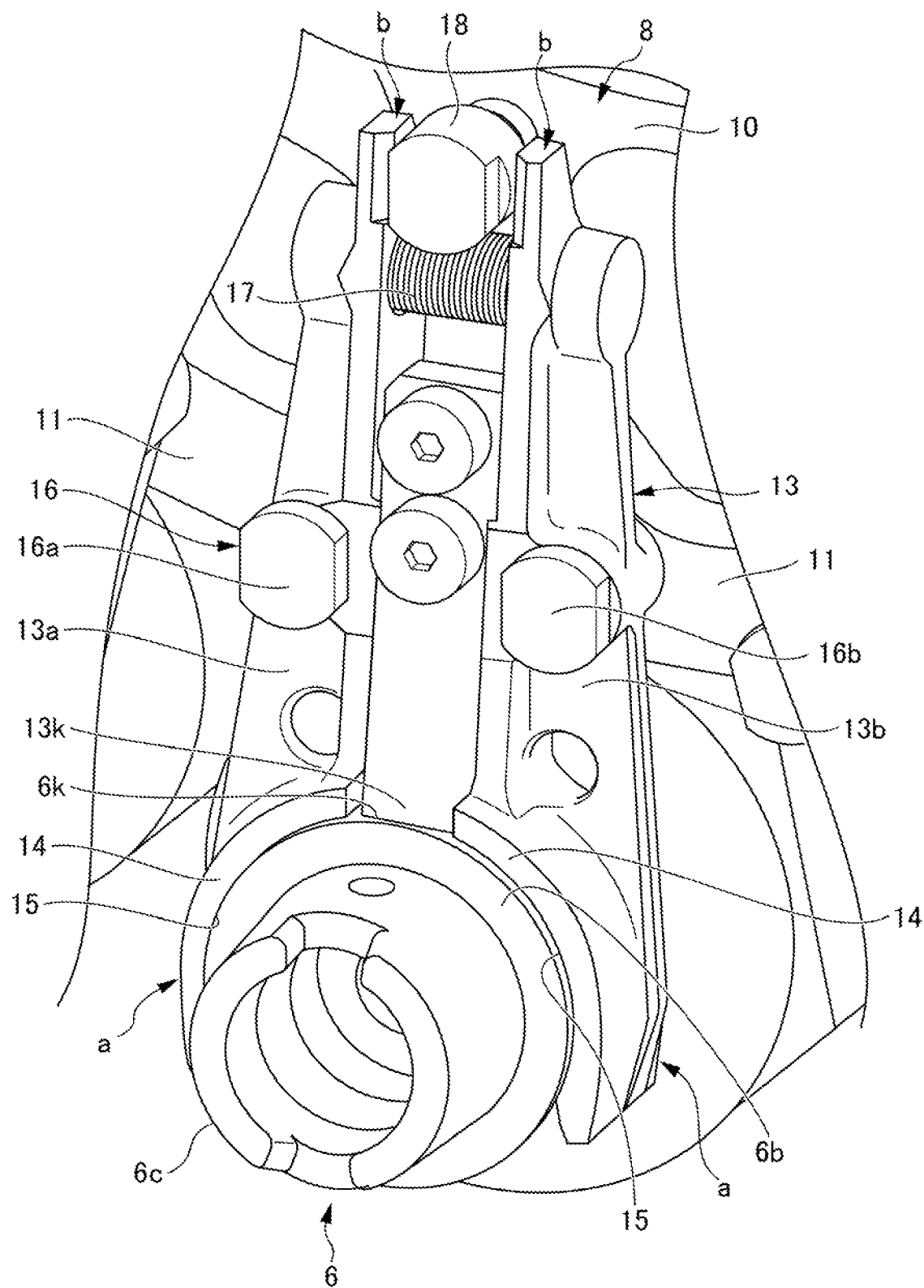
FIG. 3 is an enlarged view illustrating one tool holding mechanism in the tool magazine in FIG. 2.

Next, the tool holding mechanisms 8 will be described with reference to FIG. 3 as well. FIG. 3 is an enlarged view illustrating one tool holding mechanism 8 in the tool magazine 4 in FIG. 2. The tool holding mechanism 8 includes a pair of holding arms 13a, 13b extending from one end a to the other end b and facing each other in a direction intersecting with the direction from the one end a to the other end b. The holding arms 13 include the pair of holding arms 13a and 13b and a square rod-shaped key member 13k extending between the pair of holding arms 13a and 13b along their extending direction.

Since the pair of holding arms 13a and 13b face each other and have a mirror symmetric configuration, the pair of holding arms 13a, 13b will be collectively referred to as holding arms 13 as needed.

The holding arms 13 are provided with tool gripping portions 14 for gripping the tool 6 on their sides toward the one end a. The tool gripping portions 14 have gripping curved surfaces 15 corresponding to an outer peripheral surface of the tool 6 (the cylindrical tool holding body 6b thereof). On the other hand, the tool holding body 6b has, on its peripheral surface, key grooves 6k formed at two positions that are symmetrical with respect to the axis. The key grooves 6k are recesses corresponding to a leading end of the key member 13k in a radial direction, and the key member 13k is fitted in the key groove 6k when the tool holding body 6b is at a proper rotation phase position.

Due to the configuration described above, when the position of the tool 6 (the cylindrical tool holding body 6b thereof) relative to the tool holding mechanism 8 is a proper held position, the outer peripheral part of the tool 6 (the cylindrical tool holding body 6b) can be held between the tool gripping portions 14 of the pair of holding arms 13a, 13b without gap. Moreover, when the position of the tool 6 (the cylindrical tool holding body 6b thereof) relative to the tool holding mechanism 8 is in a tool holding failure state, the pair of holding arms 13a, 13b in the tool holding mechanism 8 inhibit return of a locking member 18 to the locking position. Therefore, it is possible to reliably detect the tool holding failure state by a detector detecting a displaced position of the holding arms.

The pair of holding arms 13a, 13b are rotatably supported at the second annular member 11 of the tool magazine 4 by support shafts that function as a pair of supports 16a, 16b at intermediate points in the extending direction from the one end a to the other end b. The pair of supports 16a, 16b will be collectively referred to as supports 16 as needed. An urging member 17 is provided between the holding arms 13 at a location adjacent to the other end b of the pair of holding arms 13a, 13b, and urges the tool gripping portions 14 in a tool gripping direction via the supports 16.

Here, the tool gripping direction is a direction in which the facing gripping curved surfaces 15 of the pair of holding arms 13a, 13b approach each other. The urging member 17 is a coil spring and urges parts of the pair of holding arms 13a, 13b abutting on the coil spring and adjacent to the other end b in a separating direction.

A shaft-shaped locking member 18 extending in the Z direction is interposed between the pair of holding arms 13a, 13b that are closer to the other end b than the coil spring abutting parts where the urging member 17 is provided. The locking member 18 has its peripheral surface abutting on the pair of holding arms 13a, 13b and moves in the Z direction as the axial direction between a locking position at which the locking member 18 causes the pair of holding arms 13a, 13b to continue gripping the tool 6 (the cylindrical tool holding body 6b thereof) with the tool gripping portions 14 and a release position at which the locking member 18 allows displacement to cause the pair of holding arms 13a, 13b to discontinue gripping the tool 6 with the tool gripping portions 14. The locking member 18 is supported at the first annular member 10 of the tool magazine 4 such that the locking member 18 can be slidably displaced in the axial direction.

Figure 4A:
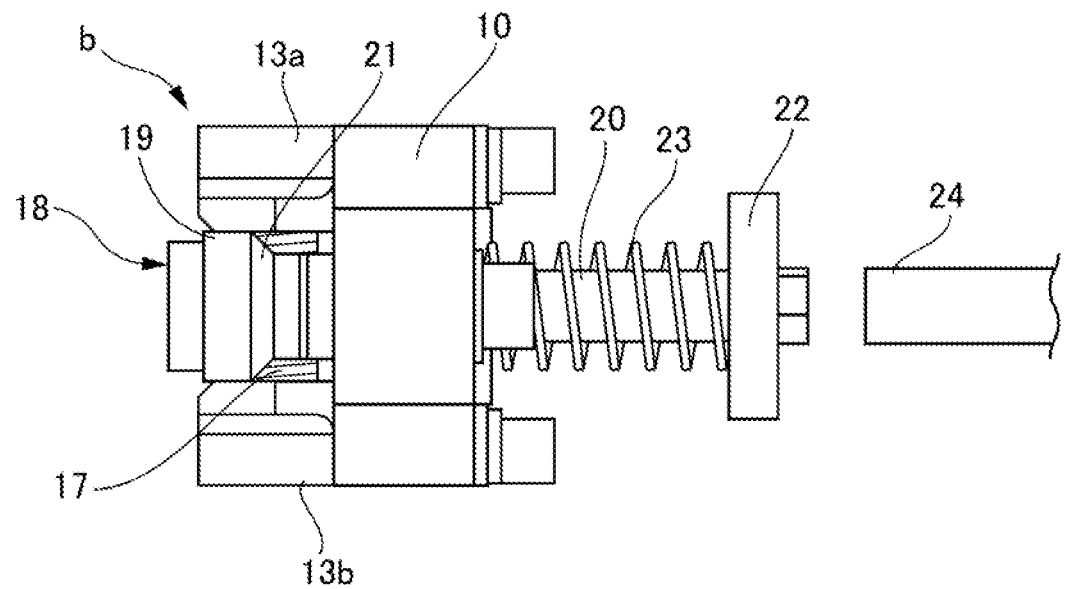
FIG. 4A is a diagram for explaining a state in which a locking member in the tool holding mechanism in FIG. 3 is at a locking position.
Figure 4B:
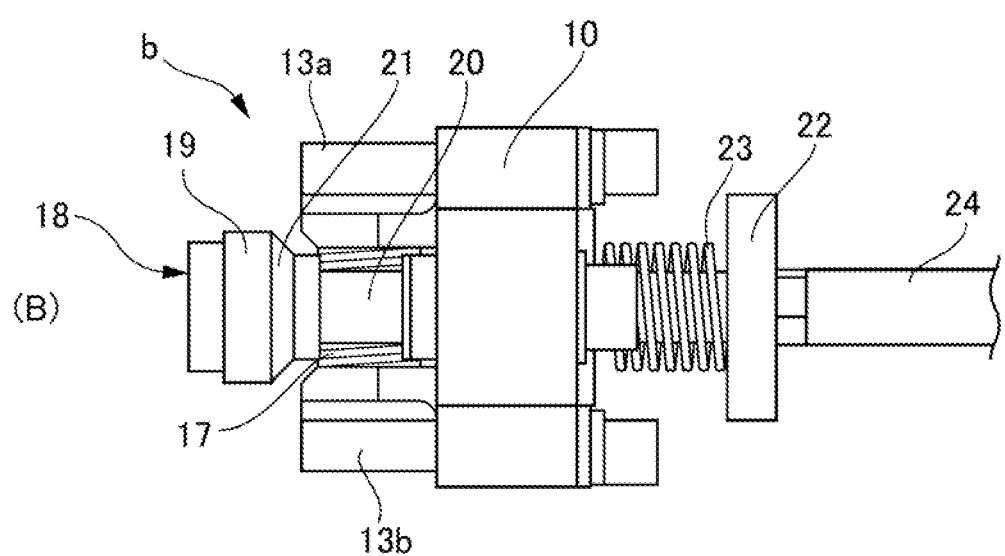
FIG. 4B is a diagram for explaining a state in which a locking member in the tool holding mechanism is at a release position.
Figure 4C:
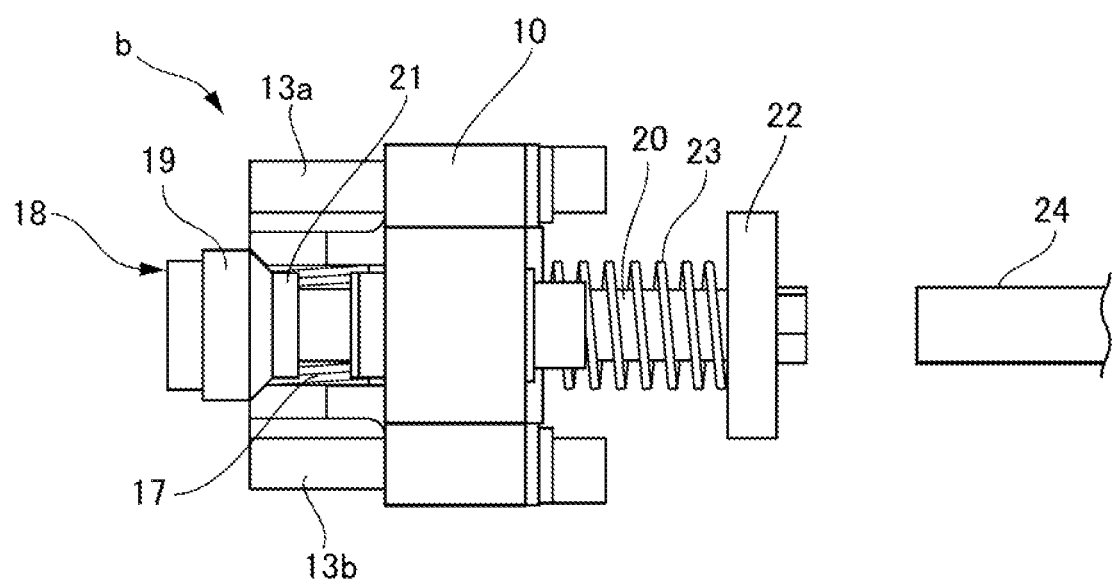
FIG. 4C is a diagram for explaining a state in which a locking member in the tool holding mechanism has moved to the release position of FIG. 4B once and then cannot return to the locking position of FIG. 4A.

Next, details of the locking member 18 and the structure therearound will be described with reference to FIG. 4A to FIG. 4C. FIG. 4A to FIG. 4C are diagrams of the locking member 18 seen from the other end b of the pair of holding arms 13a, 13b. FIG. 4A illustrates a state in which the locking member 18 is at the aforementioned locking position, and FIG. 4B illustrates a state in which the locking member 18 is at the aforementioned release position. FIG. 4C illustrates a state in which the locking member 18 has moved to the release position illustrated in FIG. 4B once and then cannot return to the locking position.

The shaft-shaped locking member 18 includes a head portion 19 that is a short columnar part with a relatively large diameter and located toward the one end side (the side of Z1 in the Z direction), a small diameter shaft portion 20 with a relatively small diameter extending in the axial direction from the head portion 19 to the other end, and a tapered portion 21 that is a part with a diameter gradually decreasing from the head portion 19 to the small diameter shaft portion 20. The locking member 18 further includes a detection target portion 22 that is a substantially disc-shaped member having a slightly larger diameter than the head portion 19. The detection target portion 22 is fixed to the small diameter shaft portion 20 at a location adjacent to an end thereof so as to be concentrically with the small diameter shaft portion 20. The detection target portion 22 is a dog for a detecting means, which will be described later, to detect a displaced position of the locking member 18 in the axial direction.

A coil spring 23 which is a returning urging member is fitted coaxially with the small diameter shaft portion 20 at a part between mutual facing surfaces of the detection target portion 22 at the small diameter shaft portion 20 and the first annular member 10. In other words, the detection target portion 22 functions also as a reaction force receiving member that receives an urging force caused by the coil spring 23. The coil spring 23 constantly applies an urging force to the locking member 18 via the detection target portion 22 as the reaction force receiving member, in a direction in which the locking member 18 is returned to the aforementioned locking position.

In a case where the pair of holding arms 13a, 13b hold the tool 6 with their tool gripping portions 14 in a proper holding state, there is a gap on the side of the end portion b of the holding arms 13a, 13b. Therefore, the urging force of the coil spring 23 advances the head portion 19 of the locking member 18 into the gap between the holding arms 13a and 13b as in FIG. 4A, whereby the head portion 19 prevents the pair of holding arms 13a, 13b adjacent to the end portion b. In this manner, the holding state of the tool 6 with the tool gripping portions 14 of the pair of holding arms 13a, 13b is maintained.

On the other hand, the machine tool 1 includes, at a predetermined portion thereof, a release rod 24 that causes the locking member 18 to move in the axial direction from the aforementioned locking position to the release position. At the timing at which the tool magazine 4 reaches a predetermined rotation phase position where the tool 6 is passed to the machining spindle 3, a state in which an end portion of the release rod 24 coaxially faces the end portion of the small diameter shaft portion 20 of the locking member 18 is achieved. In this state, the release rod 24 moves forward and presses the end portion of the small diameter shaft portion 20 under the control of a predetermined servo mechanism that responds to a servo command from the controller 100 in the machine tool 1. Consequently, the locking member 18 is displaced in the axial direction to the release position illustrated in FIG. 4B.

In a case where the locking member 18 is at the release position, a state in which the small diameter shaft portion 20 of the locking member 18 is interposed with gaps from the pair of holding arms 13a, 13b is achieved on the side of the other end b of the pair of holding arms 13a, 13b. Therefore, displacement in the direction in which the gap between the pair of holding arms 13a, 13b on the side of the other end b is narrowed is allowed. As a result, tool gripping portions 14 on the side of the one end a of the pair of holding arms 13a, 13b are turned around the supports 16a, 16b, and displacement in a direction in which the gap therebetween is widened is allowed. In other words, the displacement for releasing the holding state of the tool 6 or for receiving the tool 6 to be exchanged and attached is allowed.

When the tool 6 is passed by the tool gripping portions 14 in this state, the release rod 24 is retracted to be separated from the end portion of the small diameter shaft portion 20 of the locking member 18 under the control of the aforementioned servo mechanism. In response to the retraction of the release rod 24, the urging force of the coil spring 23 prompts displacement of the locking member 18 in such a manner that the locking member 18 returns to the locking state illustrated in the FIG. 4A.

Here, in a case where the position of the tool 6 held by the tool gripping portion 14 deviates from the proper held position, the pair of holding arms 13a, 13b is prevented from opening to the extent that the gap therebetween adjacent to the other end b becomes equal to the dimension of the outer diameter of the head portion 19 of the locking member 18. This inhibits return of the locking member 18 to the locking position. Therefore, the head portion 19 of the locking member 18 stays by being prevented from advancing into the gap between the pair of holding arms 13a, 13b adjacent to the other end b as illustrated in the FIG. 4C.

The phenomenon in which the state in the FIG. 4C is achieved will be described with reference to FIG. 5A as well.

Figure 5A:
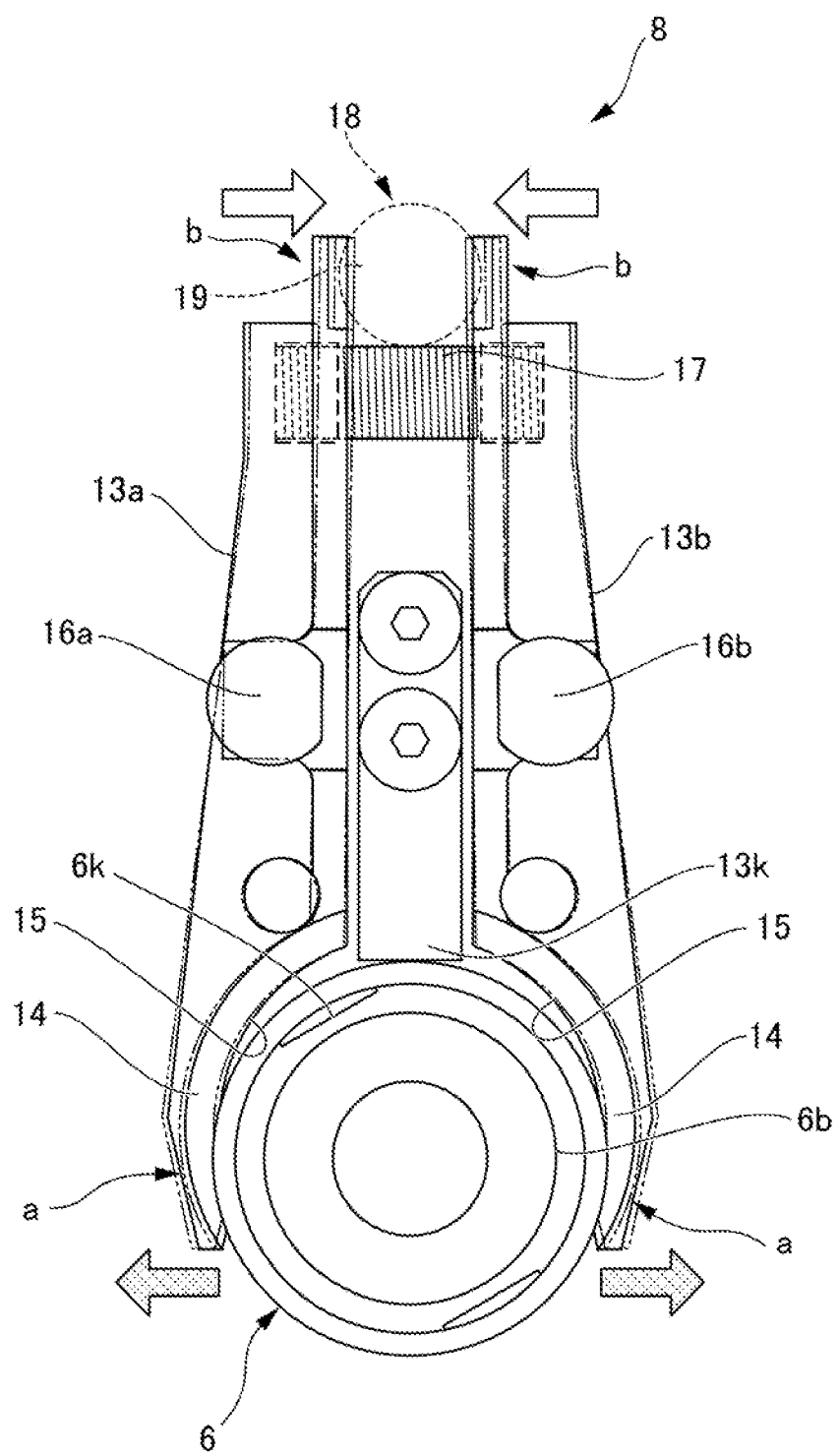
FIG. 5A is a diagram for explaining a tool holding failure state in the tool holding mechanism in FIG. 3.

FIG. 5A is a diagram for explaining a holding failure state of the tool 6 in the tool holding mechanism 8. If one tool holding mechanism 8 in the tool magazine 4 reaches the phase position at which the tool 6 is passed to the machining spindle 3 by the predetermined servo mechanism that responds to a servo command from the controller 100 in the machine tool 1, the locking member 18 is retracted to the release position illustrated in the FIG. 4B. In this state, the tool 6 moving from the machining spindle 3 toward the machine tool holding mechanism 8 is directed to the tool gripping portions 14 while the cylindrical machine tool holding body 6b thereof pushes the pair of holding arms 13a and 13b away from each other, and then, is gripped with the gripping curved surfaces 15.

In the process in which the tool 6 is passed to the tool holding mechanism 8 in this manner, the one end a and the other end b of each of the pair of holding arms 13a, 13b are displaced in mutually opposite directions around the supports 16a, 16b, respectively. At this time, the urging force of the urging member 17 urges the pair of holding arms 13a, 13b adjacent to the one end a in a direction in which the gap therebetween is closed. Therefore, the tool holding body 6b of the tool 6 moves while pushing the pair of holding arms 13a and 13b away from each other against the urging force and reaches the position where it is gripped by the gripping curved surfaces 15 of the tool gripping portions 14, and thereafter, the gap between the pair of holding arms 13a and 13b is closed due to the aforementioned urging force.

Figure 5B:
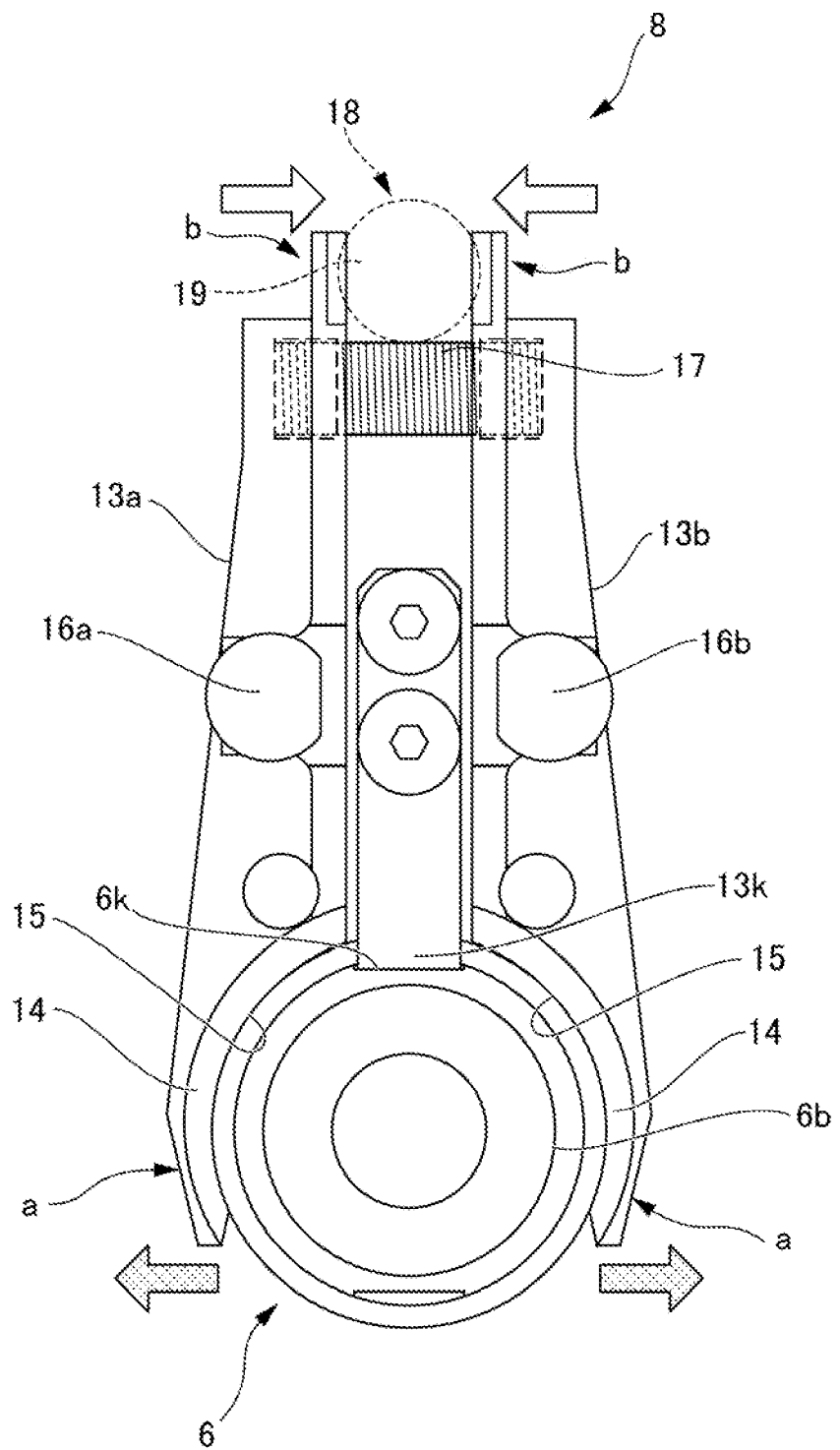
FIG. 5B is a diagram for explaining a proper tool holding state in the tool holding mechanism in FIG. 3.

On the other hand, FIG. 5B is a diagram for explaining the proper holding state of the tool 6 in the tool holding mechanism 8. Upon the tool holding body 6b of the tool 6 reaching the proper rotation phase, the key member 13k is fitted into the key grooves 6k. In this manner, the tool 6 is held in the proper holding state by the tool gripping portions 14.

Once this state is achieved, the pair of holding arms 13a, 13b adjacent to the one end a are closed to leave a predetermined gap, and as a result, the sides adjacent to the other end b return to the state in which the head portion 19 of the locking member 18 can advance into the gap therebetween, as illustrated in the FIG. 4A. However, if the tool holding body 6b of the tool 6 is not in the proper rotation phase as in FIG. 5A, the key member 13k cannot be fitted into the key groove 6k.

In this state, the peripheral surface of the tool holding body 6b of the tool 6 is pressed downward with the key member 13k, the gripping with the holding arms 13 at the proper position is inhibited, thereby achieving a state in which the tool 6 is gripped to such an extent that the tool 6 does not drop. In other words, the tool 6 is not held in the proper holding state with the tool gripping portion 14 and stays at the position at which a part where the outer peripheral surface of the tool holding body 6b does not follow the gripping curved surfaces 15 of the tool gripping portions 14 remains, and the abnormal state in which the locking member 18 cannot return to the position as illustrated in the FIG. 4C is achieved.

In other words, the state in which the gap between the pair of holding arms 13a and 13b adjacent to the one end a remains wider than that at the proper held position, and as a result, a state in which the gap between the pair of holding arms 13a and 13b adjacent to the other end b remains narrower than that at the proper held position. In this state, the locking member 18 cannot return to the state illustrated in the FIG. 4A as described above and remains at the position of the abnormal state illustrated in the FIG. 4C.

Here, involvement of the pair of holding arms 13a, 13b in the passing of the tool 6 and the actuation of the locking member 18 is described. The pair of holding arms 13a, 13b inhibit return of the locking member 18 to the locking position in a case where the position of the tool 6 held by the tool gripping portions 14 deviates from the proper held position. The state illustrated in FIG. 5A and FIG. 4C corresponds to the state of the inhibition.

The apparatus according to the present embodiment determines a tool holding failure by a detector 25 that detects a displaced position of the locking member 18 in the axial direction in the state illustrated in FIG. 4C. The detector 25 and the structure therearound will be described with reference to FIG. 6.

Figure 6:
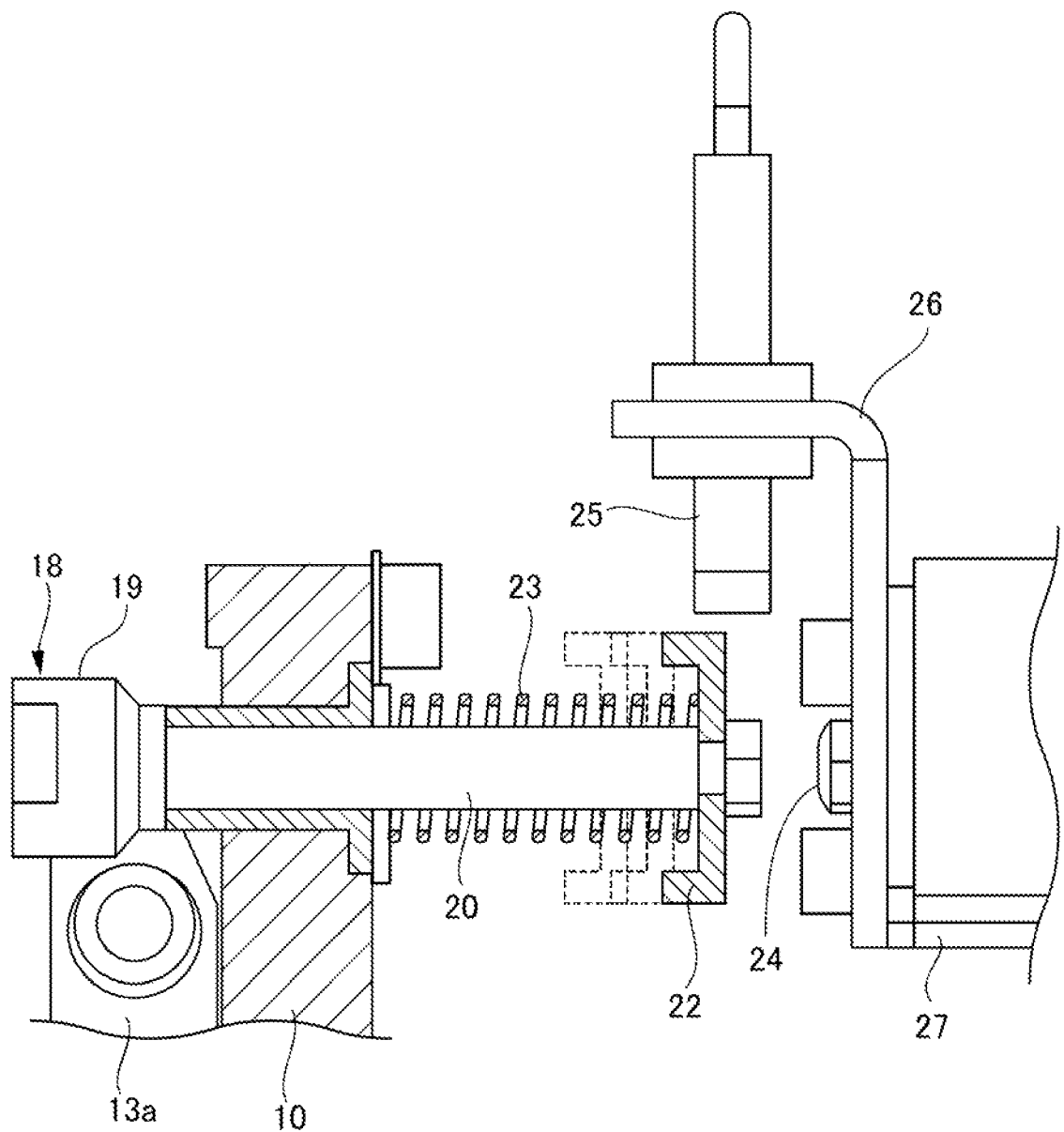
FIG. 6 is a diagram illustrating a structure around a detector applied to the apparatus for detecting a failure in holding a tool of a machine tool according to an embodiment of the present invention.

FIG. 6 is a diagram illustrating the detector 25 and the structure therearound applicable to the apparatus for detecting a failure in holding a tool of a machine tool according to an embodiment of the present invention. As described above with reference to FIGS. 4 and 5, whether or not a satisfactory holding state of the tool 6 (tool holding body 6b) in the tool holding mechanism 8 is achieved is detected depending on the displaced position of the locking member 18 in the axial direction. The displaced position of the locking member 18 in the axial direction is recognized by the controller 100 on the basis of a detection output of the detector 25 in accordance with the position of the dog, which is the detection target portion 22 that moves integrally with the locking member 18.

The detector 25 is installed in a detection region which is a three-dimensional region corresponding to the locking position at the displaced position of the locking member 18 in the axial direction. Each of the plurality of tool holding mechanism 8 provided in the tool magazine 4 to be radially arranged at intervals in the circumferential direction passes the tool 6 (tool holding body 6b) to the machining spindle 3 at the passing position which is a predetermined rotation phase position of the tool magazine 4.

The detector 25 is fixed to a predetermined portion of the machine tool 1 so that the detector 25 functions as a single detector 25 that is common to the detection target portions 22 of the plurality of tool holding mechanisms 8 in order to detect the position of the respective detection target portion 22 in the detection region at the passing position that is common to the plurality of tool holding mechanisms 8. Therefore, the machine tool 1 does not include a lot of detectors, the overall configuration is simplified, and maintenance management is also facilitated.

In the example in FIG. 6, the detector 25 is mounted in correspondence with the displaced position at which the detection target portion 22 is when the release rod 24 is retracted from the position where it pushes the end of the small diameter shaft portion 20 of the locking member 18 and when the head portion 19 of the locking member 18 is in the state illustrated in FIG. 4A due to the urging force of the coil spring 23. In other words, the detector 25 is fixed by a support member 26 such that a probe faces a location in the aforementioned detection region facing the outer periphery of the detection target portion 22.

In this case, the support member 26 is a plate-shaped member attached to a surface of a housing 27 of the release rod 24 facing the small diameter shaft portion 20 of the locking member 18. The support member 26 is attached to a front surface of the housing 27 that is orthogonal to the release rod 24. The support member 26 extends up to a predetermined outer position of the housing 27 in the direction along the front surface and is bent at a substantially right angle so as to be parallel to the small diameter shaft portion 20 of the locking member 18 from the outer position, and the detector 25 is held at the position extended from the bent part by a predetermined dimension such that the probe can face the outer periphery of the detection target portion 22. From the viewpoint in FIG. 6, the support member 26 has a substantially L shape. The detector 25 is a magnetic sensor as a non-contact-type detector. Therefore, maintenance management of the detector 25 and the structure therearound is facilitated, and further, a detection error due to chips generated during cutting, a coolant for the cutting, or the like is unlikely to occur, thereby making it possible to obtain an accurate detection result.

The detection output of the detector 25 is supplied to the controller 100 of the machine tool 1, and whether or not a satisfactory tool holding state is achieved is determined there. The determination method will be described now with reference to FIGS. 7 and 8.

Figure 7:
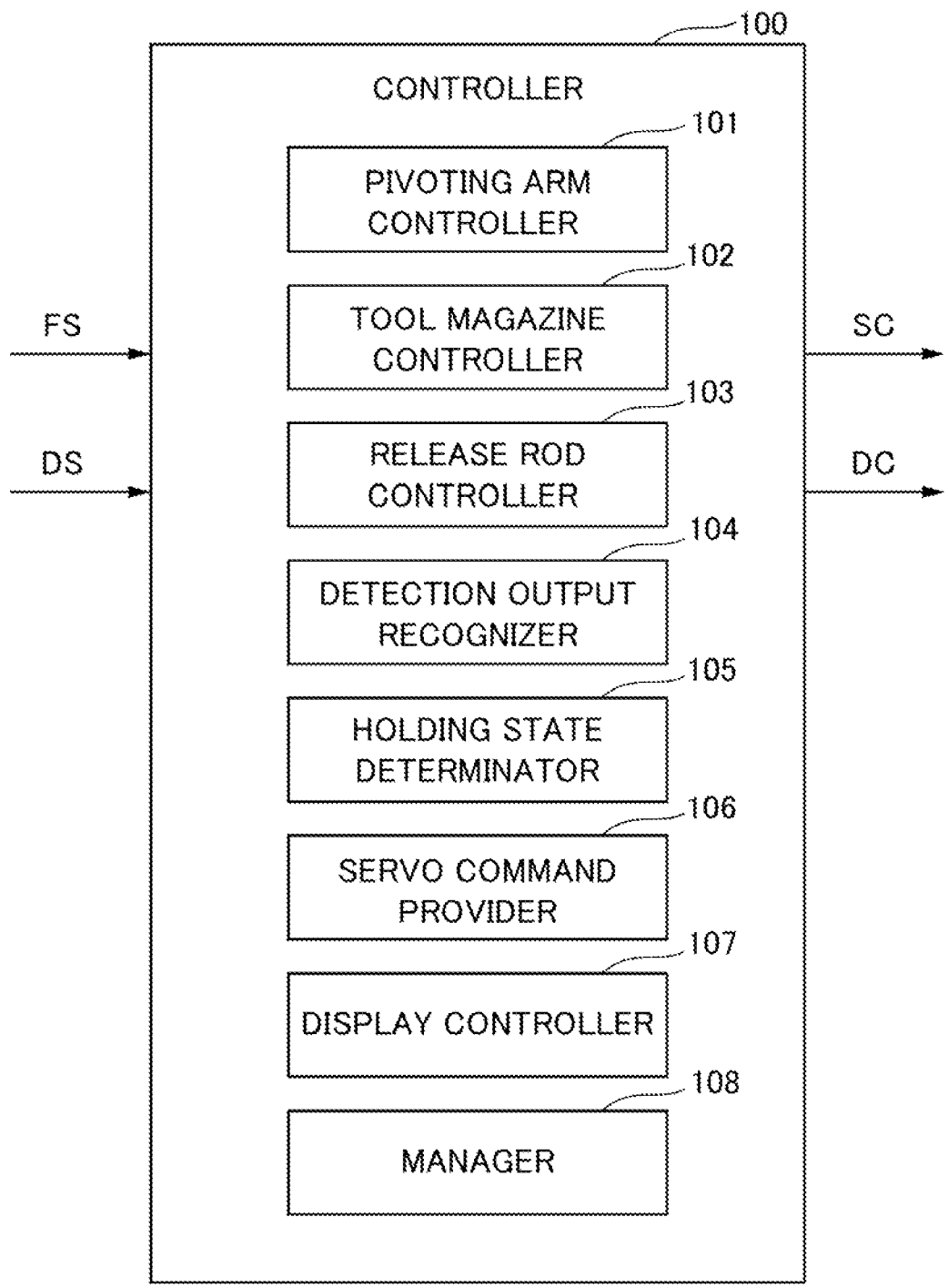
FIG. 7 is a functional block diagram of a controller included in the machine tool in FIG. 1.
Figure 8:
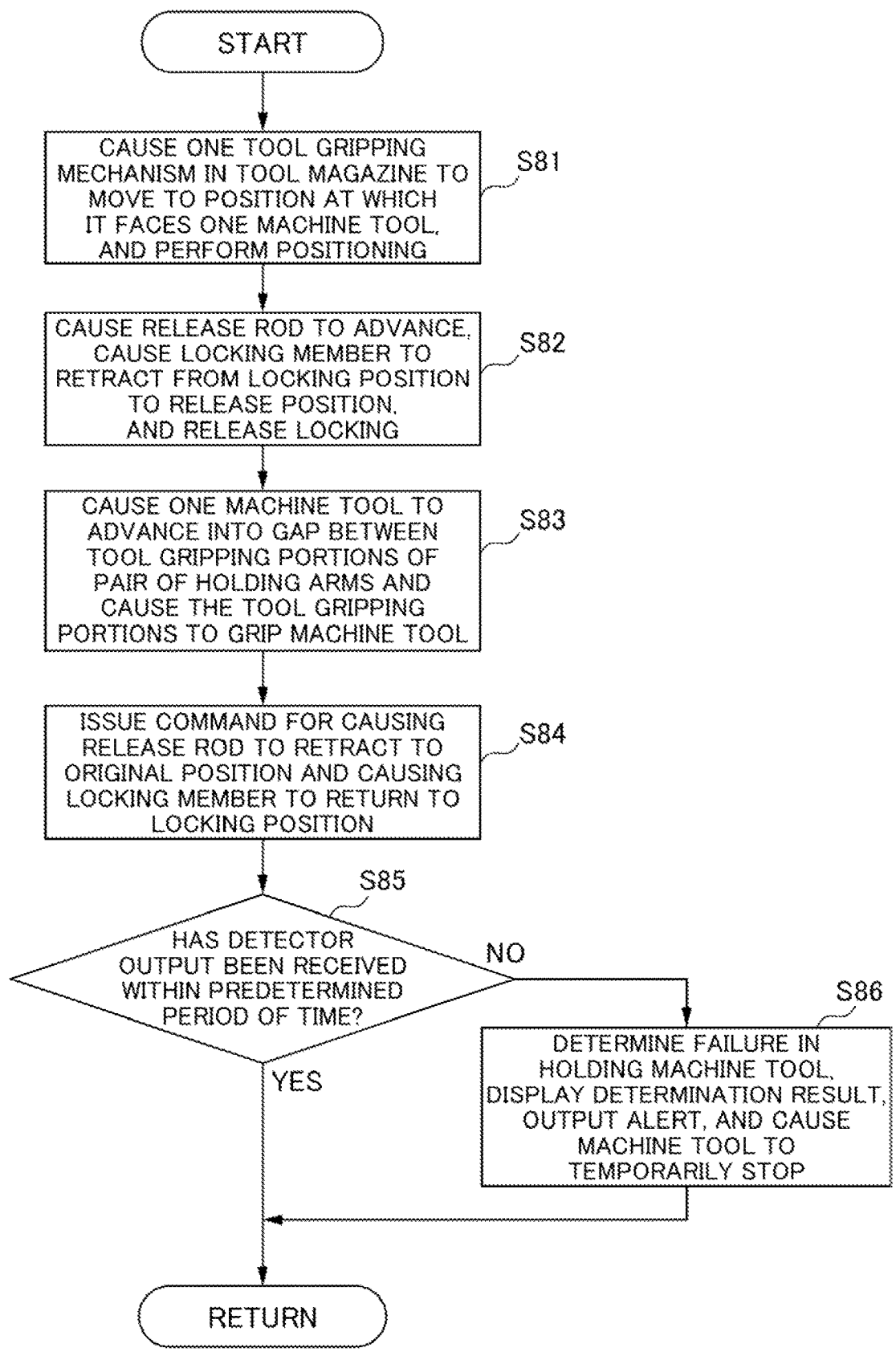
FIG. 8 is a flowchart showing a method for detecting a failure in holding a tool of a machine tool according to an embodiment of the present invention.

FIG. 7 is a functional block diagram of the controller 100 included in the machine tool 1 and particularly is a functional block diagram regarding the passing of the tool 6 by the tool holding mechanism 8 and the function of determining whether or not a satisfactory tool held state is achieved. FIG. 8 is a flowchart representing a method for detecting a failure in holding a tool of a machine tool according to an embodiment of the present invention and particularly is a flowchart regarding the passing of the tool 6 by the tool holding mechanism 8 and the method for determining whether or not a satisfactory tool holding state is achieved.

In FIG. 7, the controller 100 includes a pivot arm controller 101, a tool magazine controller 102, a release rod controller 103, a detection output recognizer 104, a holding state determinator 105, a servo command provider 106, a display controller 107, and a manager 108. The controller 100 issues various servo commands SC regarding machining on a workpiece and exchanging of tools to causes corresponding servo mechanisms in the machine tool 1 to operate. Further, the controller 100 issues a display command DC to cause a predetermined display to display information. On the other hand, the controller 100 receives a feedback signal FS from the servo mechanism that responds to the servo command SC. Additionally, the controller 100 receives a detection signal DS from the detector 25.

The pivot arm controller 101, the tool magazine controller 102, and the release rod controller 103 supply the servo commands SC to the corresponding servo mechanisms in the machine tool 1 through the servo command provider 106 and causes the servo mechanisms to perform operations in accordance with a predetermined program. The detection output recognizer 104 recognizes the detection signal DS received from the detector 25. The holding state determinator 105 determines whether or not a satisfactory holding state of the tool 6 in the tool holding mechanism 8 is achieved, according to a condition in which the detection output recognizer 104 recognizes the detection signal DS. The manager 108 recognizes states of the pivot arm controller 101, the tool magazine controller 102, the release rod controller 103, the detection output recognizer 104, the holding state determinator 105, the servo command provider 106, and the display controller 107, establishes required coordination therebetween, and comprehensively manages them. The manager 108 also includes a functional unit regarding a man-machine interface with an operator.

Next, the passing of the tool 6 by the tool holding mechanism 8 and the determination of whether or not a satisfactory tool holding state is achieved, which are performed under management of the controller 100, will be described with reference to the flowchart in FIG. 8. The tool magazine controller 102 turns the tool magazine 4 by controlling the servo mechanism for turning the tool magazine 4 in response to the servo command SC, causes one tool gripping mechanism 8 in the tool magazine 4 to move to a position where the tool gripping mechanism 8 faces one tool 6 (tool holding body 6*b*), and performs positioning (Step S81). Step S81 corresponds to the positioning step in the method according to the present embodiment.

Then, the release rod controller 103 controls the servo mechanism that drives the release rod 24 in response to the servo command SC, causes the release rod 24 to move forward to retract the locking member 18 from the locking position to the release position, and brings the locking member 18 into the locking release state (Step S82). Step S82 corresponds to the locking release step in the method according to the present embodiment.

Subsequently, the pivot arm controller 101 controls the servo mechanism that turns the pivot arm 3*a* in response to the servo command SC, causes the machining spindle 3 to move so as to advance one tool 6 (tool holding body 6*b*) attached to its leading end into the gap between the tool gripping portions 14 of the pair of holding arms 13*a*, 13*b* (Step S83). In this manner, in a case where the tool 6 is in the proper held state, the facing tool gripping portions 14 are pushed away from each other by way of passing of the peripheral surface of the tool holding body 6*b*, and, the facing tool gripping portions 14 are then closed due to the urging force of the urging member 17 following the passing, whereby the tool 6 (tool holding body 6*b*) is held. At this time, the peripheral surface of the tool 6 (tool holding body 6*b*) and the gripping curved surfaces 15 of the tool gripping portions 14 abut on each other with substantially no clearance therebetween. Step S83 corresponds to the gripping step in the method according to the present embodiment.

Next, the release rod controller 103 issues a servo command SC for causing the servo mechanism that drives the release rod 24 to retract the release rod 24 and returning the locking member 18 from the locking position to the release position (Step S84). Step S84 corresponds to the returning step in the method according to the present embodiment.

In this way, the release rod 24 returns from the state where the release rod 24 has moved forward to the state where the release rod 24 is retracted toward the housing 27. In other words, the locking member 18 is brought into a state in which the release rod 24 is separated therefrom and one condition for enabling the locking member 18 to return to the locking position illustrated in FIG. 4A is satisfied. It takes a predetermined time for the locking member 18 to return to the locking position even in a case where the tool 6 has been brought into the proper held state.

In the state in which the locking member 18 has returned to the locking position, the peripheral edge of the detection target portion 22 that moves integrally with the locking member 18 is at a proximal position facing the leading end of the probe of the detector 25 in FIG. 6. In this state, the detector 25 which is a proximity switch issues a detection output. The holding state determinator 105 monitors whether or not the detection output from the detector 25 has been received within the aforementioned predetermined period of time (Step S85).

A case where the detection output from the detector 25 is received within the predetermined period of time in Step S85 (Step S85: YES) indicates that the locking member 18 has returned properly to the locking position illustrated in FIG. 4A. In other words, the tool 6 at the tool gripping portions 14 in the tool holding mechanism 8 is held in a proper held state. Since there is no problem for the machine tool 1 to continue its operation in this state, the process for detecting a failure in holding the tool is ended.

On the other hand, in a case where the detection output of the detector 25 is not received within the predetermined period of time (Step S85: NO), the holding state determinator 105 determines a failure in holding the tool, issues the display command for a predetermined display through the display controller 107, causes the display to display the determination result, further issues the servo command SC through the manager. 108, and causes the machine tool 1 to temporarily stop (Step S86). In response to this, the operator of the machine tool 1 can take necessary measures. This configuration makes it possible to avoid the disadvantage that the tool 6 is not held properly in the tool magazine 4, which can lead to a breakdown of or damage to the machine tool 1. Step S85 and Step S86 correspond to the determination step in the method according to the present embodiment.

Figure 9A:
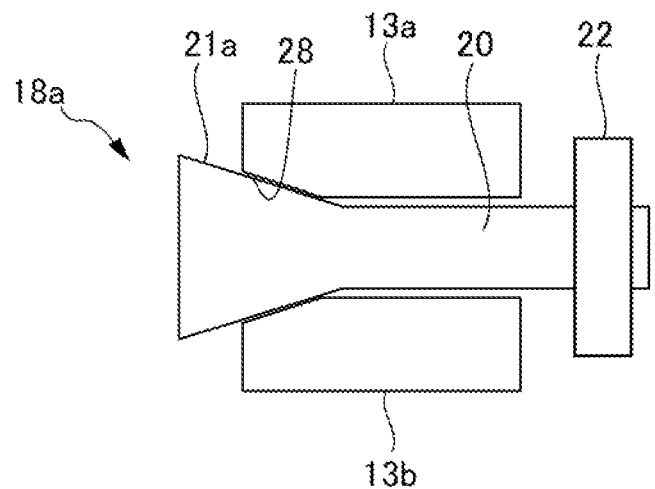
FIG. 9A is a schematic diagram for explaining main parts of an apparatus according to another embodiment of the present invention, in the state corresponding to FIG. 4A.
Figure 9B:
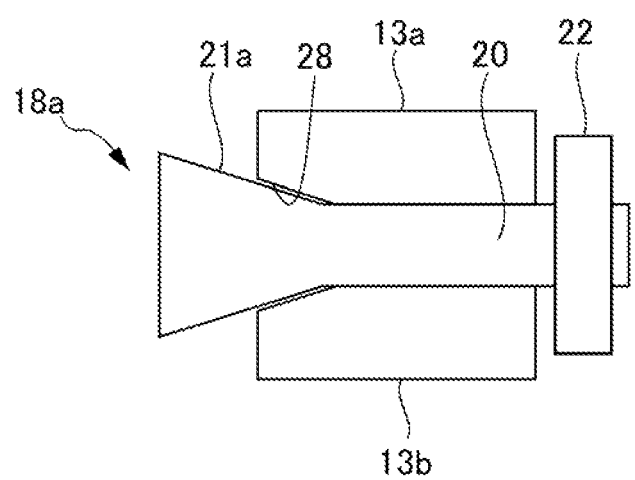
FIG. 9B is a schematic diagram for explaining main parts of an apparatus according to another embodiment of the present invention, in the state corresponding to FIG. 4C.

FIG. 9A and FIG. 9B are schematic diagrams for explaining main parts of an apparatus for detecting a failure in holding a tool of a machine tool according to another embodiment of the present invention. In the embodiment illustrated in FIG. 9A and FIG. 9B, a driven rod 18*a* is employed instead of the locking member 18 described with reference to FIGS. 4A to 4C and FIG. 6. The other configurations are similar to those of the machine tool 1 described with reference to FIGS. 1 to 8. The parts in FIG. 9A and FIG. 9B corresponding to those in FIGS. 4A to 4C and FIG. 6 are denoted by the same reference signs. Further, illustration of a returning urging member (coil spring) fitted coaxially with the small diameter shaft portion 20 is omitted from the schematic diagram.

In the driven rod 18*a*, parts corresponding to the head portion 19 and the tapered portion 21 of the locking member 18 described with reference to FIGS. 4A to 4C and FIG. 6 together form a tapered portion 21*a*. In other words, the head portion 19 of the locking member 18 is not included, and one end portion of the small diameter shaft portion 20 forms a partial conical body with a diameter increasing toward the one end portion. In the tool holding mechanism 8, the holding arms 13*a*, 13*b* adjacent to the other end b have, on their portions to face the partial conical body, inclined surfaces 28 that follow the peripheral surface of the partial conical body.

In the state in FIG. 9A corresponding to FIG. 4A, the tool 6 is held in the proper held state by the pair of holding arms 13*a*, 13*b* adjacent to the one end a in the tool holding mechanism 8. In this state, the gap between the pair of holding arms 13*a*, 13*b* adjacent to the other end b is relatively widened. Therefore, the tapered portion 21*a* of the driven rod 18*a* advances relatively deeply into the gap between the inclined surfaces 28 and is disposed on the other end where the detection target portion 22 is included. The position of the detection target portion 22 is detected by the detector 25 at this displaced position as in FIG. 6, and it is confirmed that the tool 6 is held in the proper held state.

In the state in FIG. 9B corresponding to FIG. 4C, the tool 6 is not held in the proper held state by the pair of holding arms 13*a*, 13*b* adjacent to the one end a, in the tool holding mechanism 8, and a tool holding failure state is achieved. In this state, the gap between the pair of holding arms 13*a*, 13*b* adjacent to the other end b remains relatively narrow. Therefore, the tapered portion 21*a* of the driven rod 18*a* cannot advances deeply between the inclined surfaces 28, and the driven rod 18*a* cannot be displaced to the other end side on which the detection target portion 22 is included. At this position, the position of the detection target portion 22 is not detected by the detector 25 as in FIG. 6, and it is determined that the tool 6 has been brought into the holding failure state.

According to the apparatus and the method for detecting a failure in holding a tool of a machine tool according to the present embodiment, the following advantages are achieved.

In the apparatus for detecting a failure in holding a tool of a machine tool according to the first aspect, each of the plurality of tool holding mechanisms 8 in the tool magazine 4 is provided with the tool gripping portions 14 on the side of the one end a of the pair of holding arms 13a, 13b to grip the tool 6 (tool holding body 6b). The tool gripping portions 14 are constantly urged in the tool gripping direction (the direction in which the gap between the tool gripping portions 14 is closed) by the urging member 17.

Also, the pair of holding arms 13a, 13b are allowed to be displaced to discontinue gripping the tool 6 (tool holding body 6b) with the tool gripping portions 14 against the urging force of the urging member 17 when the locking member 18 has moved to the release position, and are caused to continue gripping the tool 6 (tool holding body 6b) with the tool gripping portions 14 when the locking member 18 has returned to the locking position.

The pair of holding arms 13a, 13b inhibit the return of the locking member 18 to the locking position in a case where the position of the tool 6 (tool holding body 6b) held with the tool gripping portions 14 has deviated from the proper held position (FIG. 5). Therefore, the detector 25 detects a holding failure state in which the position of the tool 6 (tool holding body 6b) in the tool holding mechanism 8 has deviated from the proper held position by detecting the position of the detection target portion 22 that moves integrally with the locking member 18.

In the apparatus for detecting a failure in holding a tool of a machine tool according to the second aspect, the detector 25 that detects the position of the detection target portion 22 that moves integrally with the locking member 18 is fixed to a predetermined portion in the machine tool 1, and functions as a single detector 25 that is common to the detection target portion 22 of each of the plurality of tool holding mechanisms 8. Therefore, the machine tool 1 does not include a lot of detectors, the overall configuration thereof is simplified, and maintenance management is also facilitated.

In the apparatus for detecting a failure in holding a tool of a machine tool according to the third aspect, each of the tool gripping portions 14 of the pair of holding arms 13a, 13b of each of the plurality of tool holding mechanisms 8 has a gripping curved surface 15 corresponding to an outer peripheral surface of a cylindrical portion of the tool 6 or a tool holding body 6b integrated with the tool. This feature makes it possible to reliably hold the tool 6 (tool holding body 6b) between the tool gripping portions 14 of the pair of holding arms 13a, 13b in a case where the position of the tool 6 (tool holding body 6b) relative to the tool holding mechanism 8 is the proper held position.

Moreover, the pair of holding arms 13a, 13b in the tool holding mechanism 8 inhibit return of the locking member 18 to the locking position in a case where the relative positions of the tool holding mechanism 8 and the tool 6 (tool holding body 6b) are in a tool holding failure state. This feature makes it possible to detect the tool holding failure state by the detector 25 that detects a displaced position of the locking member 18.

In the apparatus for detecting a failure in holding a tool of a machine tool according to the fourth aspect, the controller 100 that controls the machine tool 1 monitors the detection output from the detector 25, and in a case where the detection output indicating the return of the locking member 18 to the locking position is not received within the predetermined period of time following issuance of a control command to return the locking member 18 to the locking position after causing after the locking member. 18 to move to the release position, the controller 100 issues the output indicating the determination of a failure in holding the tool for the tool 6 (tool holding body 6b).

This feature makes it thus possible to obtain an accurate result of determination of a failure in holding the tool in consideration of the time required for the proper operation of holding the tool 6 (tool holding body 6b) to be held in the tool holding mechanism 8.

In the method for detecting a failure in holding a tool of a machine tool according to the fifth aspect, (the tool gripping portions 14 of) one tool gripping mechanism 8 in the tool magazine 4 is caused to move to a position where the tool gripping mechanism 8 faces one tool 6 (tool holding body 6b) in the positioning step (FIG. 8: Step S81), the locking member 18 is caused to retract from the locking position to the release position in the locking release step (FIG. 8: Step S82), and movement that opens the gap between the tool gripping portions 14 of the tool gripping mechanism 8 is allowed. In the subsequent gripping step (FIG. 8: Step S83), the one tool 6 (tool holding body 6b) is caused to advance into the gap between the tool gripping portions 14 of the pair of holding arms 13a, 13b.

In the returning step (FIG. 8: Step S84), the locking member 18 is caused to return to the locking position where the gap between the tool gripping portions 14 of the tool gripping mechanism 8 is closed. At the time of the return of the locking member 18, a failure in holding the tool is determined in the determination step (FIG. 8: Step S85, Step 386) in a case where the return of the locking member to the locking position is not detected within a predetermined period of time following a start of the returning step. This feature makes it possible to obtain an accurate result of determination of a failure in holding the tool in consideration of the time required for performing the proper operation for holding the tool to be held in the tool holding mechanism 8.

In the method for detecting a failure in holding a tool of a machine tool according to the sixth aspect, the detection of the position of the locking member 18 is performed using the detector 25 that functions as a single detector common to the plurality of tool holding mechanisms 8 in the determination step (FIG. 8: Step S85, Step S86). Therefore, only a small number of detectors 25 are needed, and the maintenance management is facilitated.

In the method for detecting a failure in holding a tool of a machine tool according to the seventh aspect, the detection of the position of the locking member 18 is performed using the non-contact-type detector 25 in the determination step (FIG. 8: Step S85, Step S86). Therefore, maintenance management of the detector 25 and the structure therearound is facilitated.

In the method for detecting a failure in holding a tool of a machine tool according to the eighth aspect, a magnetic sensor is used as the non-contact-type detector 25. Therefore, a detection error due to chips generated during cutting, a coolant for the cutting, or the like is unlikely to occur, thereby making it possible to obtain an accurate detection result.

While the embodiments of the invention have been described in the foregoing, the present invention is not limited thereto. Configurations of detailed parts may be appropriately modified within the scope of the spirit of the present invention. Although the locking member 18 and the driven rod 18a are shaft-shaped bodies extending parallel with the support shafts as the supports 16a, 16b of the holding arms 13a, 13b and the displaced position in the axial direction thereof is detected by the detector 25 in the aforementioned embodiments, for example, another configuration can be adopted instead.

Specifically, a configuration may be adopted in which a driven member configured to advance into the gap between the facing surfaces of the holding arms 13a, 13b on the side of the other end b by an amount of displacement that changes in accordance with the size of the gap between the facing surfaces is provided to be movable in the extending direction of the holding arms 13a, 13b from the side of the other end b thereof, and in which the displaced position of such a driven member is detected by a non-contact-type detector may also be adopted.

EXPLANATION OF REFERENCE NUMERALS a: One end
b: Other end
DC: Display command
DS: Detection signal
FS: Feedback signal
SC: Servo command
1 Machine tool
1L: First machine tool
1R: Second machine tool
2: Surface plate
2a: Work table
3: Machining spindle
3a: Pivot arm
4: Tool magazine
5: Auxiliary tool magazine
6: Tool
6a: Cutting tool
6b: Tool holding body
6c: Attachment portion
6k: Key groove
7: Support body
8: Tool holding mechanism
9: Rotation shaft
10: First annular member
11: Second annular member
12: Spoke member
13, 13a, 13b: Holding arm
13k: Key member
14: Tool gripping portion
15: Gripping curved surface
16, 16a, 16b: Support (support shaft)
17: Urging member
18: Locking member
18a: Driven rod
19: Head portion
29: Small diameter shaft portion
21, 21a: Tapered portion
22: Detection target portion
23: Coil spring
24: Release rod
25: Detector
25: Support member
27: Housing
28: Inclined surface
100: Controller
101: Pivot arm controller
102: Tool magazine controller
103: Release rod controller
104: Detection output recognizer
105: Holding state determinator
106: Servo command provider
107: Display controller
108: Manager

What is claimed is:

1. An apparatus for detecting a failure in holding a tool of a machine tool including a tool magazine that holds a plurality of tools in an attachable/detachable manner, and configured to use one tool of the plurality of tools by selectively and exchangeably attaching the one tool to a machining spindle, the apparatus comprising:

a plurality of tool holding mechanisms configured to hold the tools and provided to the tool magazine,
wherein each of the tool holding mechanisms includes
a pair of holding arms that extend from one end side to an other end side and include tool gripping portions provided on the one end side to grip the tool,
a pair of supports that are provided at intermediate points of the pair of holding arms in an extending direction,
an urging member that is provided between the pair of holding arms at a location adjacent to the other end side of the holding arms and urges the tool gripping portions in a tool gripping direction via the supports,
a locking member that is interposed between the pair of holding arms and provided at a location closer to the other end side than a location where the urging member is provided, and is movable between a locking position where the locking member causes the pair of holding arms to continue gripping the tool with the tool gripping portions and a release position where the locking member allows displacement to cause the pair of holding arms to discontinue gripping the tool with the tool gripping portions, and
a detection target portion, which moves integrally with the locking member, a position of which is detected by a predetermined detector, and
wherein the pair of holding arms inhibit return of the locking member to the locking position in a case where the position of the tool held by the tool gripping portions has deviated from a proper held position.

2. The apparatus for detecting a failure in holding a tool of a machine tool according to claim 1,
wherein the detector is fixed to a predetermined portion of the machine tool, and functions as a single detector that is common to the detection target portion of each of the plurality of tool holding mechanisms.

3. The apparatus for detecting a failure in holding a tool of a machine tool according to claim 1,
wherein each of the tool gripping portions of the pair of holding arms has a gripping curved surface corresponding to an outer peripheral surface of a cylindrical portion of the tool or a tool holding body integrated with the tool.

4. The apparatus for detecting a failure in holding a tool of a machine tool according to claim 1,
wherein the machine tool operates under control of a predetermined controller, and the controller monitors a detection output from the detector, and in a case where the detection output indicating return of the locking member to the locking position is not received within a predetermined period of time following issuance of a control command to return the locking member to the locking position after causing the locking member to move to the release position, the controller issues an output indicating determination of a failure in holding the tool for the tool.

5. A method for detecting a failure in holding a tool of a machine tool including a tool magazine that holds a plurality of tools in an attachable/detachable manner, and configured to use one tool of the plurality of tools by selectively and exchangeably attaching the one tool to a machining spindle, the tool magazine including a plurality of tool holding mechanisms that hold the tools, each of the tool holding mechanisms including a pair of holding arms that extend from one end side to an other end side and include tool gripping portions provided on the one end side to grip the tool, a pair of supports that are provided at intermediate points of the pair of holding arms in an extending direction, an urging member that is provided between the pair of holding arms at a location adjacent to the other end side of the holding arms and urges the tool gripping portions in a tool gripping direction via the supports, and a locking member that is interposed between the pair of holding arms and provided at a location closer to the other end than a location where the urging member is provided, and is movable between a locking position where the locking member causes the pair of holding arms to continue gripping the tool with the tool gripping portions and a release position where the locking member allows displacement to cause the pair of holding arms to discontinue gripping the tool with the tool gripping portions, the method comprising:

a positioning step of causing one of the tool gripping mechanisms in the tool magazine to move to a position where the tool gripping mechanism faces one tool;

a locking release step of causing the locking member to retract from the locking position to the release position;

a gripping step of causing the one tool to advance into a gap between the tool gripping portions of the pair of holding arms;

a returning step of causing the locking member to return to the locking position; and a determination step of determining a failure in holding the tool in a case where a detection output from a detector indicating return of the locking member to the locking position is not issued within a predetermined period of time following a start of the returning step.

6. The method for detecting a failure in holding a tool of a machine tool according to claim 5,
   wherein in the determination step, detection of the position of the locking member is performed using the detector that functions as a single detector common to the plurality of tool holding mechanisms.

7. The method for detecting a failure in holding a tool of a machine tool according to claim 5,
   wherein in the determination step, detection of the position of the locking member is performed using a non-contact-type detector.

8. The method for detecting a failure in holding a tool of a machine tool according to claim 7, wherein a magnetic sensor is used as the non-contact-type detector.

\* \* \* \* \*